Feb. 20, 1934.  F. W. MEBOLD  1,947,867
METHOD OF MANUFACTURING CONNECTER BOLTS
Filed July 22, 1932  3 Sheets-Sheet 1
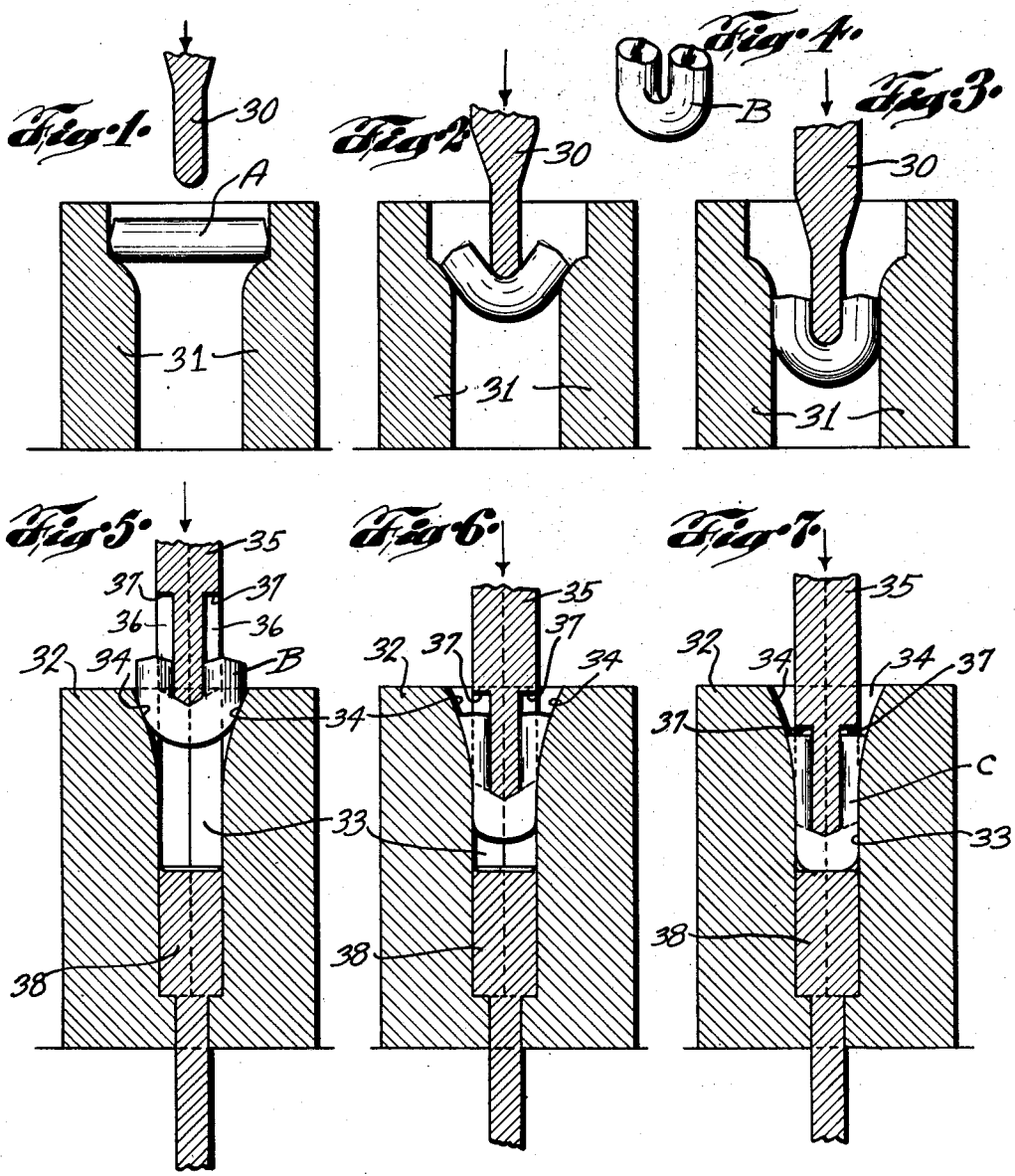
INVENTOR.
FREDERICK WILLIAM MEBOLD
BY
ATTORNEYS Feb. 20, 1934.   F. W. MEBOLD   1,947,867
METHOD OF MANUFACTURING CONNECTER BOLTS
Filed July 22, 1932   3 Sheets-Sheet 2

INVENTOR.
FREDERICK WILLIAM MEBOLD
BY
Eilers & Schaumberg
ATTORNEYS

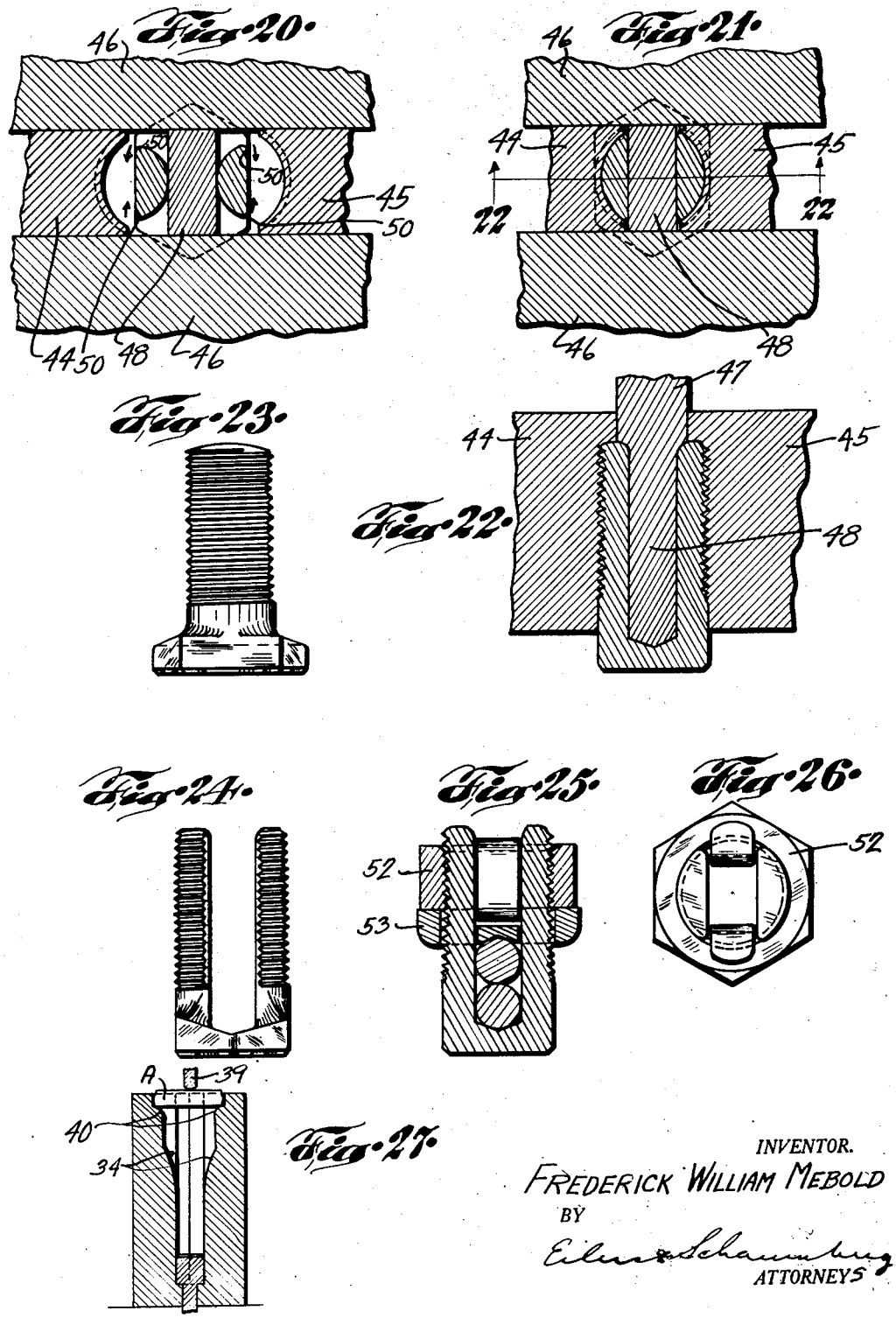

Patented Feb. 20, 1934

1,947,867

UNITED STATES PATENT OFFICE 1,947,867

METHOD OF MANUFACTURING CONNECTER BOLTS

Frederick William Mebold, St. Louis, Mo., assignor to James R. Kearney Corporation, St. Louis, Mo., a corporation of Missouri Application July 22, 1932. Serial No. 623,954

11 Claims. (Cl. 10—27)

This invention relates to the manufacture of clamping members and more particularly to improved method and means for manufacturing connecter bolts such as are employed in certain prevailing types of wire clamping and fastening devices.

The principal object of the present invention is to reduce the cost of manufacturing certain clamping members such as connecter bolts. This object is accomplished by the provision of a new and highly economical manufacturing method wherein but relatively few machine operations are required to produce the finished article, and in which, as distinguished from former methods of producing similar articles, there is absolutely no waste of the metal stock from which the device is formed.

Another object of this invention is to provide a new and improved method for producing bolts and the like from a relatively soft, ductile metal, such as copper, which method results in an article characterized by a density and hardness greatly exceeding these qualities of the stock from which the device is formed without involving heat treating, alloying, or tempering operation.

Another object is to provide a die structure for accomplishing the foregoing objects.

Figure 11:
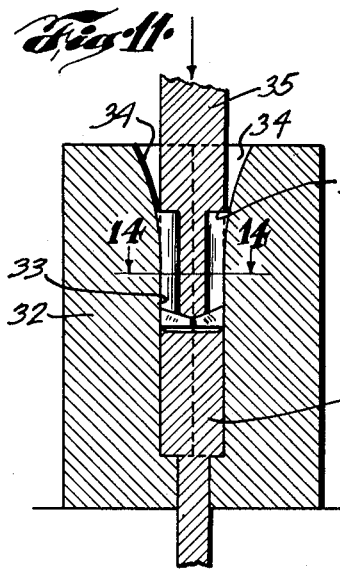
Figure 12:
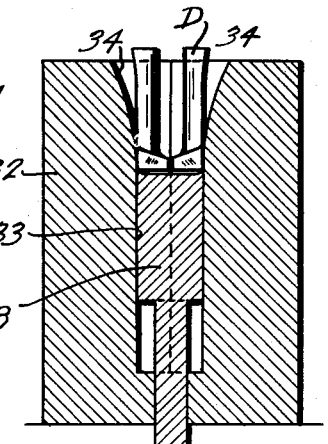
Figure 13:
Figure 15:
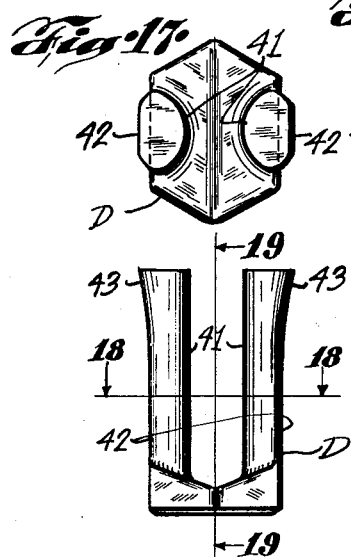
Figure 17:
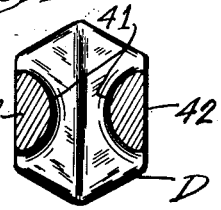
Figure 14:
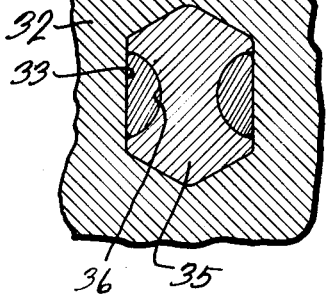
Figure 16:
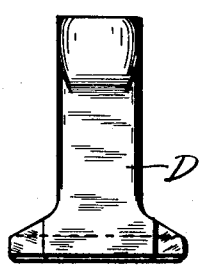
Figures 18, 19:
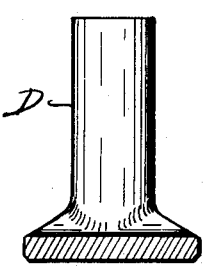

These and other objects and advantages will appear from the following detailed description, to be considered in connection with the accompanying drawings, of which Figs. 1, 2 and 3 are sectional elevations showing a punch and die assembly in three sequential, relative positions, each thereof illustrating a stage in the process of forming a U-shaped element from a short metal cylinder or billet; Fig. 4 is a perspective view of the element formed by the punch and die of Figs. 1, 2 and 3; Figs. 5, 6 and 7 are sectional elevations, each showing a stage in the process of drawing out and shaping the legs of the element of Fig. 4, in a combination drawing and swaging die; Fig. 8 is a side elevation of the element as it would appear subsequent to the drawing operation and prior to the swaging operation as conducted in the die of Figs. 5, 6 and 7; Fig. 9 is a different side elevation of the element shown in Fig. 8; Fig. 10 is a sectional plan view of the element of Fig. 8 taken along the line 10—10 of that figure; Fig. 11 is a sectional elevation of the drawing and swaging die showing a position of the die parts and element, immediately after completion of the swaging operation; Fig. 12, a sectional elevation, illustrates one manner in which the element may be removed from the die after the drawing and swaging operation has been completed; Fig. 13 is a plan view of the drawing and swaging die; Fig. 14 is a horizontal sectional view of the die and element, taken along the line 14—14 of Fig. 11; Figs. 15 and 16 are side views, and Fig. 17 a plan view of the element as it appears subsequent to the drawing and swaging operations; Figs. 18 and 19, respectively, are sectional views of the element appearing in Fig. 15, the views being taken along lines 18—18 and 19—19 of that figure; Figs. 20 and 21 are transverse sections, and Fig. 22 is a longitudinal section of a thread-forming die with the element disposed therein, the views being described with reference to such element; Figs. 23 and 24 are dissimilar side views of the completed bolt element; Figs. 25 and 26, respectively, are sectional elevational and plan views of a wire connecter of a type employing a connecter bolt which may be formed in accordance with the present invention, and Fig. 27 is a sectional elevation of a combination bending, drawing and swaging die.

In the following description, particular reference is made to the formation of clamping bolts for wire connecters and the like. Copper and brass are the metals generally used for this purpose, copper being the most desirable because of its relatively lower cost and higher conducting properties. Heretofore, however, bolts produced from brass were preferred, because of their greater hardness. Copper is preferably employed in the manufacture of bolts by the process to be presently described, since by reason of its high ductility, this metal readily lends itself to the drawing operation which forms an important step in the present method. The combination drawing and swaging process greatly increases the density of the metal and results in an article having a degree of hardness which equals, and in certain instances exceeds that of brass.

Describing, now, the process of my invention in detail, copper, or other suitable ductile metal in the form of rod or coil stock, is fed into a power press which includes cut-off means (not shown), and punch and die parts 30 and 31, respectively, Figs. 1, 2 and 3. In this press, a pre-cut slug or billet A, Fig. 1, being a predetermined length of the aforesaid metal stock, is bent into a U-shaped element, designated B, Fig. 4. The cutting and bending operation, above described, prepares the billet for the treatment in the drawing and swaging die, shown in Fig. 5 and subsequent figures. As will hereinafter appear, the cutting, bending, drawing and swaging operations may take place in a single machine, and with a single stroke of a punch.

The drawing and swaging die consists of a metal block 32 having a well 33, formed therein. In transverse section, the well 33 corresponds to the shape of the bolt-head, which in the present example is hexagonal, as best appears from Figs. 17 and 18. Disposed in opposite side walls of the well 33 is a pair of drawing grooves 34 which taper inwardly from the mouth of the well. In order to attain a bolt of the desired characteristics without metal checks and fractures, the drawing grooves 34 are preferably designed so that their angularity, curvature, and slope conforms to certain principles well known to those skilled in the art of wire drawing. Cooperating with the die 32 is a punch member 35 consisting of a plunger which is arranged for reciprocating movement in the well 33. The punch or plunger 35 closely fits the well 33, except for a pair of longitudinally disposed, leg-forming recesses 36, each of which lies opposite one of the drawing grooves 34 when the plunger is in an intermediate position. The recesses 36 extend from the end of the plunger to a distance equal to the internal length of the bolt legs to be formed thereby, and terminate in swaging shoulders 37. Forming a closure for the lower end of the well 33 is a second plunger 38, which remains stationary during the drawing and swaging operation, and thereafter operates to expel the element from the well 33.

Referring now to Figs. 5, 6 and 7, with the leg portions of the element D disposed in the tapering throat formed by the drawing grooves 34, the punch member 35 is caused to descend into the well, the end of the punch engaging the member B at the under surface of the crown, as appears in Fig. 5. Continued downward movement of the punch causes the metal of the leg portions to be drawn inwardly and downwardly of the grooves 34, the legs being reduced in sectional area and shaped in a manner analogous to the well known method of attenuating a copper billet in the manufacture of wire by the so called hard drawn process. The drawing operation continues until the crown of the element engages the upper surface of the plunger 38 (Fig. 7), at which stage a small part of the leg metal is left remaining in the lower extremities of the drawing grooves, and the swaging shoulders 37 are slightly spaced from the ends of the legs.

Figs. 8, 9 and 10 illustrate the bolt element C as it would appear if taken from the die immediately prior to the swaging operation. During the drawing operation there is substantially no lateral displacement of the metal at the crown of the element, which portion forms the head of the bolt. Such displacement, however, occurs during the swaging operation. The compressive force applied initially, by the end of the plunger 35 to the under side of the crown, and shortly thereafter by the swaging shoulders 37, to the ends of the legs, causes the metal to flow laterally, and so completely to fill the hexagonal space between plungers 35 and 38. It will appear that the extreme compression to which the element is subjected at this stage, greatly increases the density, and hence the hardness of the metal as an important incident to the above described swaging operation.

From the description thus far, it will appear that the bending operation, described in connection with Figs. 1, 2 and 3, and the drawing and swaging operations, described with reference to Figs. 5, 6, 7 and 11, may all be effected in a single die having the combined features of the dies shown in Figs. 1 and 11. Such a die is shown in Fig. 27. As appears from this figure, a punch 39 is adapted to operate, during the initial, effective portion of its downward stroke, to bend the billet into U-form, the ends of the slug being supported upon rounded bending shoulders 40 while it is struck by the punch. As the punch 39 (which may be similar to the corresponding member 35 of Fig. 5) continues its downward stroke, the bent leg portions of the element are forced through the drawing grooves 34, and thereafter the swaging operation takes place as previously described in connection with Fig. 11.

Referring now to Fig. 12, after completion of the swaging operation the element is ejected from the die by the upward movement of the throw-out plunger 38. At this stage in the sequence of operations, the bolt element, now designated D, appears as shown in Figs. 15 to 19, inclusive. It may be observed that while the head of the bolt is completely formed, the leg portions have yet to receive a final shaping operation which is accomplished in a thread-swaging die, to be hereinafter described. Thus, in the unfinished element (Fig. 18), the inner surfaces 41 of the leg portions are curved, and the outer surfaces 42 are flat, while in the finished bolt (Fig. 26) the reverse conditions exist. Also, a small lip 43 (Figs. 15 and 17) is preferably left remaining at the ends of the leg portions for purposes to be hereinafter mentioned.

In Figs. 20, 21 and 22 there is shown a thread-swaging die which consists, essentially, of a pair of complementary die-sections 44 and 45, having threads formed on their concave, mating surfaces. The section 44, by preference, is fixedly positioned between a pair of spaced blocks 46 which form guides for the relatively movable die section 45. Disposed between the die sections 44 and 45 and the guide blocks 46 is a floating member 47 having a tongued portion 48 which is shaped to conform to the space between the legs of a finished bolt. The tongue 48 provides a backing for each of the bolt legs, and serves to maintain them in parallel, spaced relation during treatment in the threading die.

The bolt element is inserted over the end of the tongue 48 and the movable die section 45 (Fig. 20) is actuated toward the stationary section 44, each leg being compressed transversely between the tongue and one of the die sections. Since, initially, the leg portions do not conform to the shape of the threading dies, these members effect a re-shaping of the leg portions as the threads are being impressed thereon. Thus, since the flat surfaces 42, of the legs are presented toward the concave threading surfaces of the die sections, the imprint of the dies will be received initially at the corners 50, and, as the leg portions are pressed to conform to the surfaces of the tongue and die sections, the metal is substantially turned into the grooves of the threading dies. This method results in threads which are regular, of full pitch, and which extend clear to the margins of the bolt slot. During treatment in the threading die, the metal normally tends to flow toward the opposite ends of each leg at the expense of the central portion, resulting in a bolt shank of non-uniform section. This unsatisfactory condition has been overcome by forming an element, prior to its treatment in the thread-swaging die, with an excess of metal at the extremities of the legs, as, in the present example is provided by the lips 43.

By reason of this additional metal, there is an increased pressure at the ends of the legs during the thread-swaging operation which prevents the metal from flowing endwardly. The provision illustrated by lips 43 has been found to result in a bolt of the desired uniform shank section. An outward stroke of the movable die section permits the bolt to be removed from the machine in completed form, as illustrated in Figs. 23 and 24.

Fig. 25 illustrates a prevailing type of wire connecter, employing a split, or bifurcate bolt which may be formed in accordance with the present invention. Wires to be joined by the connecter are extended through the bolt slot, and a nut 52, usually having a washer device 53 associated therewith, is threaded on the bolt in clamping engagement with the wires.

From the foregoing description it will appear that my invention provides a highly economical method for producing articles, exemplified by the connecter bolt herein set forth, from metal having suitable ductility; this, primarily, by reason of the fact that there is absolutely no waste of the metal stock from which the article is formed. Further, the combination drawing and swaging operation requires a die which is relatively simple and inexpensive to produce. The drawing and swaging operation adds greatly to the density and hardness of the metal, characteristics which are highly desirable in the construction of connecter bolts.

While I have described my invention as applied to the manufacture of a particular form of bolt, it will appear obvious that many different articles may be produced by the method herein set forth. I realize that various changes may be made in the forming-dies, and in the sequence of forming operations, without departing from the spirit and full intended scope of my invention as defined by the appended claims.

I claim:

1. The method of forming a connecter bolt from a ductile metal slug, which consists in bending the slug into bifurcate form, lengthening and shaping the furcations by drawing, shaping the portion connecting the furcations by swaging, and threading the furcations.

2. The method of forming a connecter bolt from a ductile metal slug, which consists in bending the slug into bifurcate form, drawing the furcations through die apertures to elongate and reshape the furcations, swaging the crown to form a bolt head, and threading the furcations.

3. A step in the method of forming a bifurcate bolt which consists in shaping and sizing the leg of a U-shaped, ductile metal element by drawing said leg through a die recess.

4. A step in the method of forming a bifurcate bolt which consists in shaping and sizing the leg portions of a U-shaped element of ductile metal by drawing said portions through die recesses, and thereafter subjecting said portions to an endwise compressive force to compact the metal thereof.

5. The method of die-forming a bifurcate connecter bolt which consists in placing a U-shaped metal billet in oppositely disposed drawing grooves of a die, forcing a plunger into said die between the legs of said billet simultaneously to draw out and shape said legs, and thereafter to swage the crown of the billet to form the bolt head.

6. The herein described method of forming a furcate metal fastening element which consists in folding a length of metal stock to form spaced furcations, in shaping said furcations by an application of pressure in a direction endwise thereto, and in simultaneously reshaping and forming threads on said furcations by an application of pressure in a direction transversely thereto.

7. The herein described method of forming a furcate metal fastening element, which consists in folding a length of metal stock into paired leg portions and a connecting portion, in shaping said leg portions by attenuation, and thereafter in endwise compacting said leg portions.

8. The herein described method of forming a metal fastening element, consisting in bending a length of metal to U-form, shaping and lengthening the leg portions thereof by drawing the metal through tapered die recesses, and pressing threads on said leg portions.

9. The herein described method of making a slotted bolt from wire or rod stock of circular section which consists in bending a suitable length of such stock to produce a U-shaped element, in drawing the leg portions of said element through recesses formed between relatively stationary and movable die parts to reduce the sectional area of, elongate, and produce a relatively flat outer surface on said leg portions, and in simultaneously rounding and threading the outer surfaces of said leg portions in suitable thread-forming dies.

10. In the manufacture of slotted bolts, the steps which consist in forming a U-shaped element, the legs of which are characterized by convex inner surfaces and substantially flat outer surfaces, and in pressing each of said legs transversely between a concave thread-forming die and a relatively flat anvil to simultaneously thread and reshape said legs.

11. In the manufacture of bolts having bifurcate shanks, the steps which consist in forming a U-shaped element having leg portions of substantially segmental section, relatively disposed with their arcuate surfaces facing inwardly, in disposing a flat surfaced spacing device between and adjacent the arcuate surfaces of said leg portions and thereafter pressing each leg portion between said spacing device and a concave thread-forming die to produce a flat inner surface and a threaded convex outer surface on each of said leg portions.

FREDERICK WILLIAM MEBOLD.